E. G. SIMPSON.
WINDSHIELD CONSTRUCTION.
APPLICATION FILED AUG. 5, 1920.
1,392,880.
Patented Oct. 4, 1921.
2 SHEETS—SHEET 1.
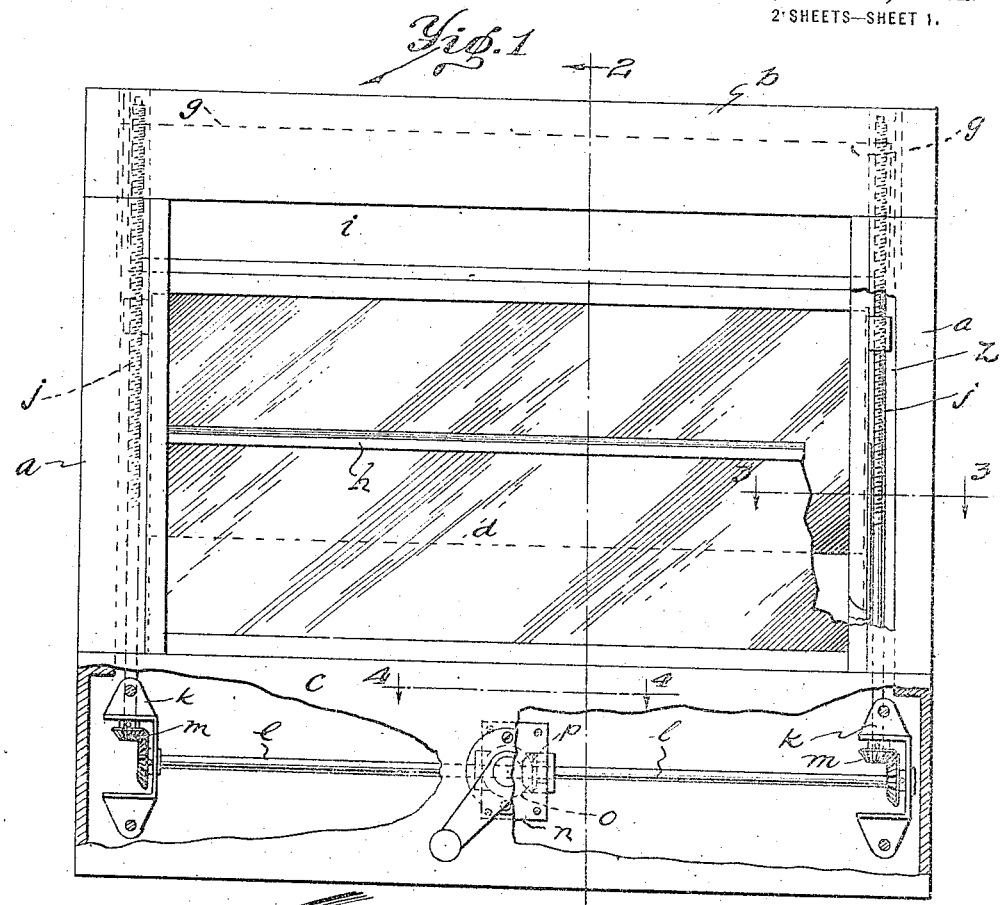
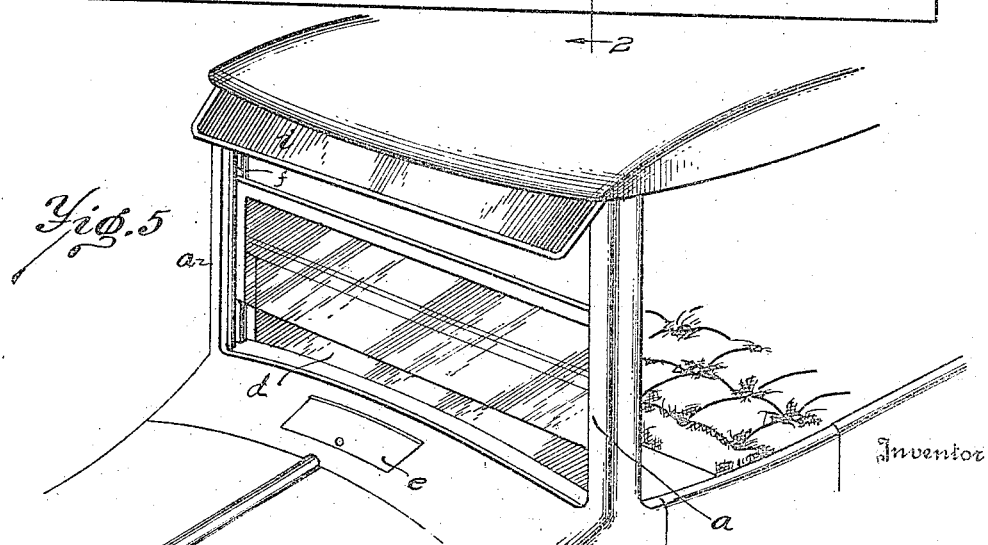

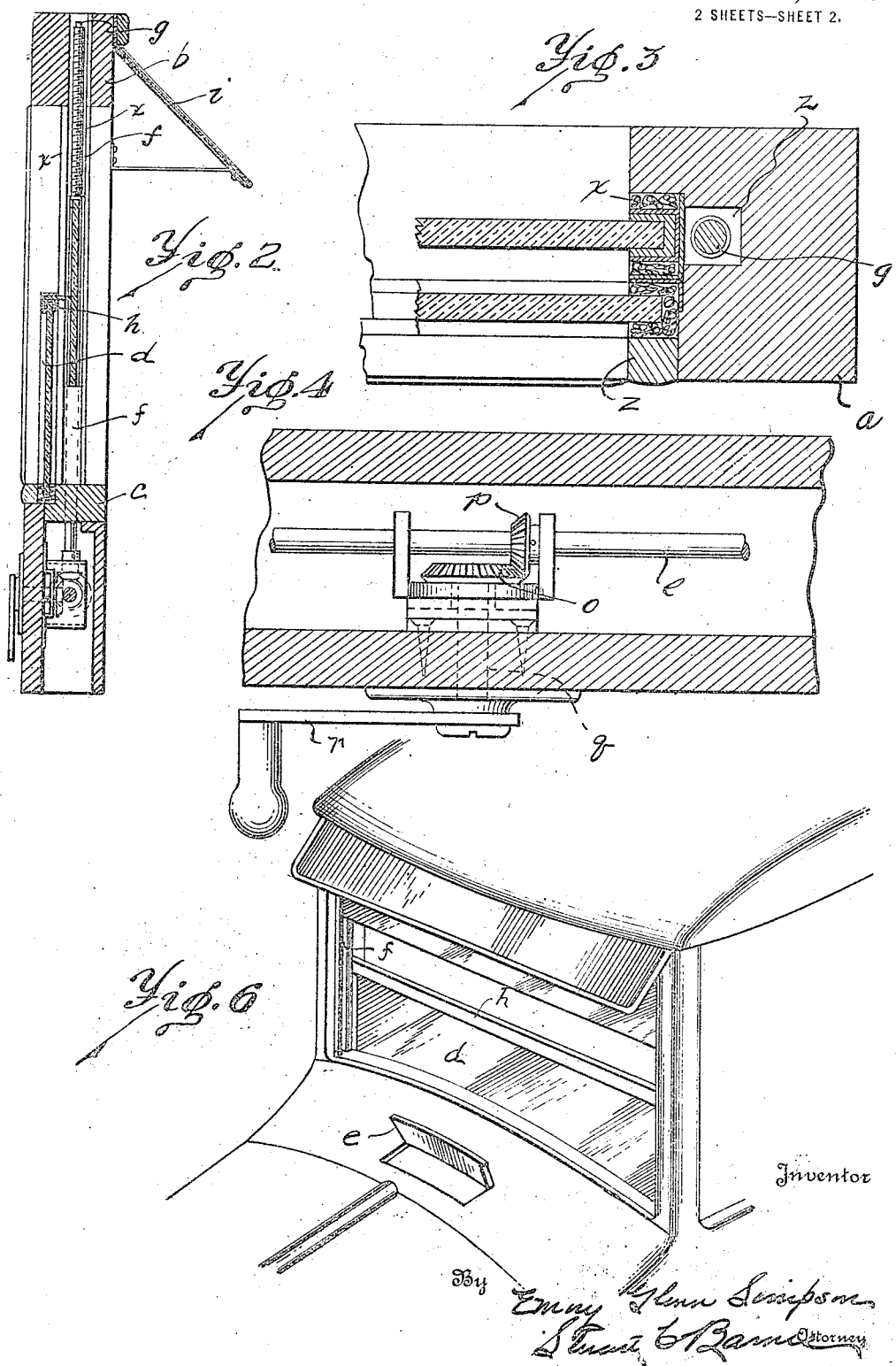

UNITED STATES PATENT OFFICE.

EMORY GLENN SIMPSON, OF HIGHLAND PARK, MICHIGAN, ASSIGNOR TO FISHER BODY CORPORATION, OF DETROIT, MICHIGAN, A CORPORATION OF NEW YORK.

WINDSHIELD CONSTRUCTION.

1,392,880.   Specification of Letters Patent.   Patented Oct. 4, 1921.

Application filed August 5, 1920. Serial No. 401,362.

*To all whom it may concern:*

Be it known that I, EMORY GLENN SIMPSON, a citizen of the United States, residing at Highland Park, in the county of Wayne and State of Michigan, have invented certain new and useful Improvements in Windshield Construction, of which the following is a specification.

This invention relates to windshields for automobiles and has for its object a mechanically-operated windshield whereby the driver of the car can adjust one of the panels while the car is moving by the aid of mechanism having an advantage in leverage.

Another improvement is the arrangement of the panel for relative movability in such a way as not to interfere with a comparatively low hanging sun-shade or a rain vision shield.

In the drawings,—

Figure 1 is an inside elevation of the shield for a closed body.

Fig. 2 is a vertical section of the same.

Fig. 3 is a fragmentary horizontal cross section through one of the posts and a part of the panels.

Fig. 4 is a fragmentary horizontal section through the shield at the bottom on the line 4—4 of Fig. 1.

Fig. 5 is a perspective of the front of an automobile showing the upper windshield panel lowered.

Fig. 6 is a similar view showing the upper panel lowered from its closed position.

The windshield is primarily intended for a closed body. $a$ designates the posts, $b$ the header, and $c$ the sill. The lower windshield panel $d$ is preferably permanently fixed between the posts and has no movement. In place of fitting this panel for ventilation, this ventilation is secured by the ventilator $e$ on the cowl. $f$ designates the window-way for the upper panel in the posts. This window-way extends into a deep window recess $g$ in the header. $h$ designates a metal weather strip clamped by the resiliency of the spring metal channel over the upper edge of the lower panel and holding a flexible rubber wiping strip which waves out of the way when the upper panel slides but still acts as a weather seal.

The sun-shade or awning $i$ can hang down comparatively low without in any way interfering with the full opening movement of the upper panel. Hence this is a considerable improvement over the short visors used in some cases to partially exclude the sun but not interfere with the movement of the upper panel.

The upper panel may be lowered from its normal position to a position of registry or overlapping relation with the lower panel, (see Fig. 5), or the panel may be raised (see Fig. 6) partially within the limits of the recess $g$ in the header. This opens the windshield directly above the top edge of the lower panel as with the customary tilting movement of the upper panel.

One of the great features of the invention is the mechanism for manipulating the upper panel from a remote point where it may be placed within easy reach of the driver of the car for use while the car is running.

This is accomplished in this embodiment of the invention by placing screws in the groove $z$ in the window post journaled in brackets $k$ only at the bottom and floating at their upper ends. The same bracket $k$ also journals the horizontal shaft operatively connected with the screws by the set of bevel gears. A bracket $n$ journals a bevel driving gear $o$ which meshes with the pinion $p$ on the shaft $l$. A spindle $q$ connects the driving gear $o$ with the crank handle $r$ located directly in front of the driver on what is ordinarily the instrument board. No clutch to keep the panel in any given position is needed as the threads of the screw are of such pitch as to be irreversible by the weight of the panel.

Obviously the panel may be easily raised or lowered by the driver while the car is traveling and the annoyance of having to stop the car to change the adjustment is avoided. Then, too, the trouble of having to ordinarily disengage a clamp before the panel can be moved is done away with.

Another important feature is the upper panel runs in side channels and the lower panel is set in side channels and no water can get in at the sides, which is a marked improvement in present day windshield construction that has a tendency to let the water in at the sides. These channels or guides may be packed as at $x$ to further exclude the weather.

What I claim is:

1. In a windshield, the combination of posts provided with window-ways, a header provided with a panel recess, a lower panel secured in place, and an upper panel slidable either into said panel recess to provide an opening between the panels or into overlapping relation with said lower panel to provide a ventilating opening between the upper panel and the header.

2. In a windshield, the combination of a pair of windshield posts, a lower panel connecting the posts at the bottom, an upper panel normally closing the space between the posts above the lower panel, and means for raising the upper panel to separate the same from the lower panel to provide a ventilating opening between the two panels and for lowering the upper panel into overlapped relation with the lower panel to allow a ventilating opening between the two posts above the upper panel.

3. In a windshield, the combination of a pair of posts, a lower panel connecting the posts at the bottom, an upper panel connecting the posts above the lower panel and normally closing the opening between the posts above the lower panel, means in each post by which the upper panel may be raised and lowered to raise the upper panel above the lower panel to provide an opening between the two panels and to lower the upper panel in lapped position with the lower panel to provide an opening between the posts above the upper panel, and actuating connections for such means including a hand-operated member located below the lower panel.

In testimony whereof I affix my signature.

EMORY GLENN SIMPSON.